US006630548B1

(12) United States Patent
Gupte et al.

(10) Patent No.: US 6,630,548 B1
(45) Date of Patent: Oct. 7, 2003

(54) STATIC REDUCTION

(75) Inventors: Kiran M. Gupte, Naperville, IL (US); Kevin Tolley, Boulder, CO (US); Joel A. Mutchler, Morris, IL (US); Charles S. Holland, Coal City, IL (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/286,182

(22) Filed: Nov. 1, 2002

(51) Int. Cl.[7] ................................. C08F 4/44
(52) U.S. Cl. ................. 526/129; 526/70; 526/901; 526/348; 526/170; 526/131; 526/141
(58) Field of Search .................. 526/901, 70, 348, 526/170, 129, 131, 141

(56) References Cited

U.S. PATENT DOCUMENTS

| | | | |
|---|---|---|---|
| 4,003,712 A | 1/1977 | Miller ..................... 23/288 S |
| 4,302,565 A | * 11/1981 | Goeke et al. ................ 526/88 |
| 4,482,687 A | 11/1984 | Noshay et al. ............. 526/125 |
| 4,483,938 A | 11/1984 | Rees .......................... 502/113 |
| 4,752,597 A | 6/1988 | Turner ....................... 502/104 |
| 4,791,180 A | 12/1988 | Turner ....................... 526/160 |
| 4,803,251 A | * 2/1989 | Goode et al. ................ 526/59 |
| 4,855,370 A | 8/1989 | Chirillo et al. ............. 526/74 |
| 5,153,157 A | 10/1992 | Hlatky et al. .............. 502/117 |
| 5,198,401 A | 3/1993 | Turner et al. .............. 502/155 |
| 5,240,683 A | 8/1993 | Maurel et al. .............. 422/135 |
| 5,241,025 A | 8/1993 | Hlatky et al. .............. 526/129 |
| 5,277,245 A | 1/1994 | Dutta et al. ............. 165/104.16 |
| 5,283,278 A | 2/1994 | Daire et al. ................ 524/399 |
| 5,414,180 A | 5/1995 | Geerts et al. .............. 585/525 |
| 5,428,118 A | 6/1995 | Painter et al. ............... 526/74 |
| 5,539,124 A | 7/1996 | Etherton et al. ........... 548/402 |
| 5,554,775 A | 9/1996 | Krishnamurti et al. ......... 556/7 |
| 5,637,660 A | 6/1997 | Nagy et al. ................ 526/160 |
| 5,648,440 A | 7/1997 | Sugano et al. ............. 526/132 |
| 5,733,510 A | 3/1998 | Chinh et al. ............... 422/143 |
| 5,902,866 A | 5/1999 | Nagy et al. ................ 526/133 |
| 6,111,034 A | 8/2000 | Goode et al. ................ 526/59 |
| 6,211,311 B1 | 4/2001 | Wang et al. ................ 526/131 |
| 6,212,794 B1 | 4/2001 | Zhu et al. .................... 34/576 |
| 6,232,260 B1 | 5/2001 | Nagy et al. ................ 502/155 |
| 6,300,429 B1 | 10/2001 | Spriggs et al. .............. 526/62 |

FOREIGN PATENT DOCUMENTS

| | | |
|---|---|---|
| EP | 0222504 | 10/1986 |
| EP | 0307074 | 7/1988 |
| EP | 0229368 | 7/1989 |
| WO | WO 93/23436 | 11/1993 |
| WO | WO 97/49771 | 12/1997 |
| WO | WO 02/30993 | 4/2002 |

* cited by examiner

*Primary Examiner*—David W. Wu
*Assistant Examiner*—William Cheung
(74) *Attorney, Agent, or Firm*—John Tyrell; Jonathan L. Schucharit

(57) ABSTRACT

A gas-phase process for polymerizing an olefin is disclosed. The process involves feeding the catalyst into the reactor in a stream of gas that comprises at least 75 volume % of a noble gas in order to reduce static.

18 Claims, No Drawings

STATIC REDUCTION

FIELD OF THE INVENTION

This invention relates to a polymerization process for olefins. In particular, the invention relates to a process that reduces reactor static.

BACKGROUND OF THE INVENTION

Reactor fouling is a known problem in the gas-phase polymerization of olefins. The fouling is due to static charge, which builds and causes solids to adhere to surfaces. The buildup of solids on the surfaces of the polymerization reactor decreases productivity and can decrease the quality of the product. The problem is sometimes manifested as sheeting. By "sheeting" is meant the adherence of fused catalyst and resin particles to the walls of the reactor. The sheets will eventually dislodge from the wall and can result in reactor plugging. Reactor buildup can be extensive enough to require shutting down the equipment for cleaning.

Several solutions to this problem have been developed, but they all have drawbacks. One partial solution is to polish the surface of the reactor in order to avoid polymer adhesion. However, this kind of polishing is expensive and the effect is not durable.

Another solution is to add antistatic or antifouling agents into the polymerization medium in order to reduce polymer buildup on the surface of the reactor. However these can be catalyst poisons or can affect polymer properties since they remain in the polymer.

In PCT application WO 93/23436, European Pat. No. 0307074, and PCT application WO 97/49771 reactor coatings are disclosed. The application of coatings adds to the cost and requires reactor down time while the coatings are applied. Coatings are not completely durable and the coating material can contaminate the product polyolefin.

U.S. Pat. No. 6,300,429 uses a falling film of water around the periphery of a fluid-bed olefin polymerization reactor to cool the wall and reduce the temperature in the fluid bed near the inside surface of the wall. Cooling has the effect of reducing static in the reactor, which in turn ameliorates a sheeting problem and can enhance production by facilitating control of the relation of the reactor temperature and the dew point of recycled gas. The process may be used concurrently with a gas cooling and condensing recycle system wherein at least some of the condensed recycle gas is injected in the vicinity of the internal wall surface. There is some added cost and complexity with this process and the results are not completely satisfactory.

U.S. Pat. No. 5,277,245 discloses a method for enhancing heat transfer in a bed of powder comprising cohesive Geldart type C particles, such as phosphors or ultrafine ceramic powders, being fluidized. The fluidizing gas is selected so as to comprise a sufficient amount of helium, hydrogen, or mixtures thereof for obtaining a thermal conductivity of the fluidizing gas of at least four times that of nitrogen for enhancing heat transfer between the wall and the bed. There is no mention of any reaction or polymerization processes. Nor is there any indication of reduced static or of reduced wall buildup. The focus seems to be merely the ability to fluidize these difficult-to-fluidize powders.

U.S. Pat. No. 6,212,794 also talks about the difficulty to fluidize certain powders such as Geldart group C powders and discloses the use of low molecular weight gases such as hydrogen, helium, deuterium and tritium. Again there is not any indication of reduced static or of reduced wall buildup. The focus seems to be merely the ability to fluidize these powders.

U.S. Pat. No. 4,003,712 discloses a fluidized bed reactor where the catalyst is stored in a reservoir under a nitrogen blanket and injected at a point about ¼ to ¾ of the height of the bed and above the distribution plate. All or part of the make up feed stream is used to carry the catalyst into the bed.

U.S. Pat. No. 5,240,683 and references cited therein disclose various devices for feeding a catalyst powder into a fluidized bed reactor. In order to give an improved feed, previous discontinuous particle delivery systems are made more continuous by using an intermediate chamber in the catalyst delivery system. While gases are used to convey the solid particles, there is no indication of any criticality to the choice of gas. The examples in the patent use a mixture of ethylene, 1-butene, hydrogen and nitrogen.

U.S. Pat. No. 6,111,034 and references cited therein teach the correlation between static buildup and reactor fouling or sheeting. They control static buildup by addition of water to dissipate the charge. While this is effective at reducing the static, water can have a deleterious effect on catalyst activity and in some situations can completely deactivate the catalyst.

Despite the importance of olefin polymerizations and the considerable work that has been done to find methods to reduce static and consequent buildup on reactor walls, there are still drawbacks to current methods. Even an incremental improvement can have a large economic effect since it decreases reactor downtime and can improve polyolefin quality.

SUMMARY OF THE INVENTION

This invention is a gas-phase process for polymerizing an olefin. Static is reduced by feeding the catalyst into the reactor in a stream of gas that comprises at least 75 volume % of a noble gas.

DETAILED DESCRIPTION OF THE INVENTION

The invention is an olefin polymerization process. Suitable olefins are $C_2$–$C_{20}$ α-olefins, such as ethylene, propylene, 1-butene, 1-hexene, 1-octene and mixtures thereof. Preferred olefins are ethylene, propylene and mixtures thereof with a-olefins such as 1-butene, 1-hexene and 1-octene.

The polymerizations are done in the gas phase. Preferably, they are done in continuous reactors. There are many suitable reactor designs for the polymerization of olefins in the gas phase. The gas-phase, fluidized-bed reactors for which this invention is most useful are those such as described in U.S. Pat. Nos. 4,003,712, 4,482,687, 4,803,251, 4,855,370, 5,428,118 and 5,733,510, the teachings of Which are incorporated herein by reference. These and other preferred reactors are characterized by a straight cylindrical section topped by a bulbous expanded section and are widely used for polymerizing olefins. They are large reactors having relatively thick steel walls, i.e. about 2–10 cm thick. These reactors are useful for the polymerization of olefins in the gas phase. A catalyst is also introduced, and as polymerization proceeds, small particles of polymer product are formed, which are suspended in the gas as a fluid bed.

Usually, the fluidized bed is supported by upwardly flowing gases. The gases comprise monomers and usually one or more inert gases such as nitrogen, ethane, propane, butane, isobutane and hexane. The gases may also contain effective amounts of components that may affect the reaction such as moderators, chain terminators, and static-control agents. Those components include hydrogen, water vapor, carbon monoxide, carboxyl-containing compounds such as ketones, aldehydes and carboxylic acids, and hydroxyl-containing compounds such as alcohols and glycols including methanol, ethanol, isopropanol, propanol and ethylene glycol. In the present invention, the gas components preferably also include noble gas present in the recycle gas from use in the catalyst feed section.

The superficial velocity of the upwardly flowing gas is preferably sufficient to support and fluidize the bed. The minimum velocity for fluidization will be dependent upon the density and size of the polymer particles and the density and viscosity of the fluidizing gas. Especially since the fluidized bed will contain a range of particle sizes, the superficial velocity should not be so high as to result in undue removal of polymer particles from the bed. Preferably, the velocity of the fluidizing gas during operation at or near the maximum design height of the bed is such that the top surface of the bed is sufficiently turbulent that particles are thrust into the expanded section. These particles include those that are typically not entrained by the fluidizing gas. These particles thrust into the expanded section aid in dislodging any deposits of polymer on the wall of the expanded section and any exposed wall region in the main section of the reaction vessel. The superficial velocity is preferably between about 1.2 and 10, more preferably 1.3 and 7.5, times the minimum velocity for fluidization of the average sized particle in the reactor. The velocity is preferably between about 0.25 and 5, more preferably between 0.3 and 4, and most preferably between 0.5 and 1, meters per second. The average polymer particle size in fluid-bed processes is preferably within the range of 30 to 2000 microns.

The static buildup can be monitored at or near the reactor wall using static voltage indicators such as voltage probes or electrodes. For example, a metal plate can be placed in a reactor and isolated from the reactor wall by Teflon® polymer. The metal plate can be connected to a meter that reads voltage. Methods of measuring static charges are described in WO 02/30993 and references therein. The absolute amount of static that can be tolerated in a reaction before there is an unacceptable buildup of solids on the reactor walls varies from reactor to reactor based upon several variables including fluidization patterns, reactor dimensions and reactor size. Generally, a smaller reactor can tolerate a larger amount of static than a larger reactor before buildup becomes too much. However, for a given reactor, the amount of static can be monitored and used on a comparative basis. The greater the static, the faster the buildup and an increase in static can be used as a signal that solids buildup is imminent. A reduction in static results in reduced solids buildup.

The catalysts useful in this invention include all of the known catalysts useful for the polymerization of olefins. Ziegler-Natta catalysts are useful for this invention. Metallocene organometallic complexes and other single site organometallic complexes are included in catalysts useful for this invention. Preferably the catalyst is supported.

By "Ziegler-Natta catalyst," we mean a transition metal compound that incorporates a Group 4–8 transition metal, preferably a Group 4–6 transition metal, and one or more ligands that satisfy the valence of the metal. The ligands are preferably halide, alkoxy, hydroxy, oxo, alkyl, and combinations thereof. Preferred Ziegler-Natta catalysts incorporate Ti, V, or Cr, most preferably Ti. Preferred Ziegler-Natta catalysts also have high thermal stability. They include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Other suitable Ziegler-Natta catalysts appear in U.S. Pat. No. 4,483,938, the teachings of which are incorporated herein by reference, and in European Pat. No. 222,504. A particularly preferable admixture is $TiCl_4$ supported on $MgCl_2$.

Preferably, the Ziegler-Natta catalysts also contain a donor. These donors are Lewis bases. Suitable electron donor compounds include alkyl esters of aliphatic and aromatic carboxylic acids, aliphatic ethers, cyclic ethers and aliphatic ketones. The use of electron donors appears in U.S. Pat. No. 4,302,565, the teachings of which are incorporated herein by reference. Preferred donors are alkyl esters of aromatic carboxylic acids.

Optionally, the Ziegler-Natta or magnesium halide-supported Ziegler-Natta catalysts are supported on a polymer or an oxide such as silica or alumina to provide a high surface area, inert support upon which to distribute the active ingredients and obtain good particle morphology.

When the catalyst is a Ziegler-Natta catalyst, a cocatalyst is also used. The cocatalyst can be any of those known in the art. Preferably the cocatalyst is an alkyl aluminum or an alkyl aluminum halide. Preferred alkyl aluminums include trialkyl or triaryl aluminum compounds, which preferably have the formula $AlR_3$ where each R is a $C_1$–$C_{30}$ hydrocarbyl. Particularly preferred alkyl aluminums are trimethylaluminum, triethylaluminum, tri-n-propylaluminum, triisopropylaluminum, tri-n-butylaluminum, triisobutylaluminum, and tri-nhexylaluminum. Suitable alkyl aluminum halides include dialkyl aluminum halide and alkyl aluminum dihalide compounds, which preferably have the formula $AlR_2X$ or $AlRX_2$ where X is Cl, Br, or I.

Exemplary alkyl aluminum halides are dimethylaluminum chloride, methylaluminum dichloride, diethylaluminum chloride, ethylaluminum dichloride, diisobutylaluminum chloride, isobutylaluminum dichloride, methylaluminum sesquichloride, ethylaluminum sesquichloride, and isobutylaluminum sesquichloride.

The cocatalyst can be added separately to the reactor through a different injection port or added with the Ziegler-Natta catalyst as a mixture or supported with the Ziegler-Natta catalyst on an inert support or by a combination of methods. Preferably the cocatalyst is added separately. When added separate from the catalyst, the cocatalyst can be added as a component of the monomer feed.

The catalyst can be a metallocene organometallic complex or a single site organometallic complex. The organometallic complex comprises a Group 3 to 10 transition metal, M, and at least one polymerization-stable, anionic ligand. Examples of suitable anionic ligands include substituted and unsubstituted cyclopentadienyl, fluorenyl, and indenyl, or the like, such as those described in U.S. Pat. Nos. 4,791,180 and 4,752,597, the teachings of which are incorporated herein by reference. A preferred group of polymerization-stable ligands are heteroatomic ligands such as boraaryl, pyrrolyl, indolyl, indenoindolyl, quinolinoxy, pyridinoxy, and azaborolinyl as described in U.S. Pat. Nos. 5,554,775, 5,539,124, 5,637,660, 5,902,866 and 6,232,260, the teachings of which are incorporated herein by reference. The organometallic complex also usually includes one or more labile ligands such as halides, alkyls, alkaryls, aryls, dialkylaminos, or the like. Particularly preferred are halides, alkyls, and alkaryls (e.g., chloride, methyl, benzyl).

The polymerization-stable ligands can be bridged. Groups that can be used to bridge the ligands include, for example, methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary organometallic complexes are bis(cyclopentadienyl)-zirconium dimethyl, bis(cyclopentadienyl)zirconium dichloride, bis(indenyl)titanium dibenzyl, bis(fluorenyl)zirconium dimethyl, 8-quinolinoxy-(cyclopentadienyl)titanium dimethyl, bis(2-pyridinoxy)titanium diethyl, (1-dimethylaminoborabenzene)cyclopentadienylzirconium dichloride, bis(1-methylborabenzene)zirconium dimethyl, bis(indolyl)zirconium dimethyl, and the like.

Preferred transition metals are Group 4–6 transition metals and of these zirconium is especially preferred.

The organometallic complex is reacted with an activator to produce an active olefin polymerization catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis-(pentafluorophenyl)borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can. be deposited onto the support along with the organometallic complex. The activator can be added separately to the reactor through a different injection port or added with the organometallic complex as a mixture or supported with the organometallic complex on an inert support or by a combination of methods. Preferably the activator is added separately. When added separate from the catalyst, the activator can be added as a component of the monomer feed.

The catalyst is optionally used with an inorganic solid or organic polymer support. Suitable inorganic supports include silica, alumina, silica-aluminas, magnesia, titania, clays, zeolites, or the like. The inorganic support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. Suitable organic polymer supports include polyethylene, polypropylene and polystyrene. Small particle size density polyethylene has been found to be particularly suitable. The catalyst and cocatalyst or activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of catalyst on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

The polymerization pressures used typically range from about 15 psig to about 15,000 psig. Preferable polymerization pressures are between about 50 psig to about 600 psig. and most preferably between about 100 psig to about 350 psig. Polymerization temperatures range from about –100° C. to about 300° C., more preferably from about 20° C. to about 200° C., and most preferably from about 60° C. to about 150° C. The heat of polymerization may be removed using any conventional means. For example, the heat of polymerization can be removed using external cooling jackets, using internal cooling surfaces, providing cold feed gases, providing injected or condensed liquids, providing means to cool recycled gas components, or any combination of these methods. The cooling provided in this manner can be utilized over portions of the polymerization process or throughout the polymerization process.

The noble gases useful in this invention are helium, neon, argon, krypton and xenon and mixtures thereof. Helium and argon and mixtures thereof are preferred. Helium is most preferred. The noble gas is used to convey the catalyst into the reactor. The noble gas can be used alone or in combination with other gases. Suitable gases to mix with the noble gas include ethylene, propylene, nitrogen and hydrogen. Nitrogen is preferred. When a mixture of gases is used, the noble gas should constitute at least 75 volume % of the gas mixture being used to convey the catalyst, preferably at least 90% of the gas mixture.

The catalyst may be metered to the fluid-bed reactor by any of several methods with the proviso that a noble gas be used to convey the catalyst. Methods of metering catalyst are disclosed in U.S. Pat. No. 5,240,683 and references cited therein. Preferably, the catalyst is metered from a chamber and mixed with the noble gas to form a suspension of the catalyst in the noble gas and this suspension is fed to the reactor. The catalyst can be introduced at any reactor location.

Preferred reactors are characterized by a straight cylindrical section topped by a bulbous expansion section. This expansion section is sometimes called a velocity reduction zone. Below the expansion section is the reaction zone, at the bottom of which is a fluidization grid. Product removal takes place at the lower part of the reaction zone, right above the fluidization grid.

Preferably, the catalyst feed port is placed above the product removal section and the fluidization grid and below the reactor expansion section. More preferably, the catalyst is added in the lower half of the reaction zone. Most preferably, the catalyst is added within one reactor diameter above the fluidization grid. In this most preferred situation, if the reactor has a diameter in the reaction zone of 2 meters, then the catalyst would be added in the lower two meters of the reaction zone.

It is known in the art that hydrogen can be used to control the molecular weight of polyolefins. When it is desired to use hydrogen in a polymerization, the hydrogen can be added separately from the catalyst or as a portion of the gas mixture being used to convey the catalyst to the reactor.

Optionally antistatic agents can also be used in the process of the invention. The choice of antistatic agent will vary dependent upon the polymer being produced and the catalyst being used. The use of antistatic agents is taught in European Pat. No. 0229368 and U.S. Pat. No. 5,283,278 and references cited therein.

The following examples merely illustrate the invention. Those skilled in the art will recognize many variations that are within the spirit of the invention and scope of the claims.

EXAMPLE 1

Over a 30 minute period, 11.1 g of calcined silica (Davison 948) was fed with a constant flow of helium gas through a 6.35 mm inner diameter stainless steel transfer pipe to simulate the flow of supported catalyst into a polymerization reactor. A 30 cm section of the transfer pipe was isolated by 2.5 cm Teflon® connectors and that section connected to a meter that read voltage, thereby giving a reading for static. This was performed in triplicate. In each instance the static was measured throughout the 30 minutes. The average static was 520 volts. For each of the runs, the amount of silica deposited on the inner wall of the transfer tube section was gravimetrically measured. The average deposition was 0.53 g.

EXAMPLE 2

Over a 30 minute period, 11.1 g of calcined silica (Davison 948) was fed with a constant flow of argon gas through the same transfer pipe apparatus as used in Example 1. This was performed in triplicate. In each instance the static was measured throughout the 30 minutes. The average static was 1300 volts. For each of the runs, the amount of silica deposited was gravimetrically measured. The average deposition was 0.83 g.

COMPARATIVE EXAMPLE 3

Over a 30 minute period, 11.1 g of calcined silica (Davison 948) was fed with a constant flow of nitrogen gas through the same transfer pipe apparatus as used in Example 1. The static was measured throughout the 30 minutes. The average static was 12,300 volts. The amount of silica deposited was gravimetrically measured to be 1.0 g.

Examples 1 and 2 of the invention show the remarkable order of magnitude reduction in generated static. This reduced static reduces deposition as seen by the lower amount of deposited silica in Examples 1 and 2.

EXAMPLE 4

Over a 60 minute period, 22.25 g of calcined silica (Davison 948) was fed with a constant flow of helium gas through the same transfer pipe apparatus as used in Example 1. The static was measured throughout the 60 minutes. The average static was −300 volts. The amount of silica deposited was gravimetrically measured to be 0.58 g.

EXAMPLE 5

Over a 60 minute period, 22.25 g of calcined silica (Davison 948) was fed with a constant flow of argon gas through the same transfer pipe apparatus as used in Example 1. The static was measured throughout the 60 minutes. The average static was 1300 volts. The amount of silica deposited was gravimetrically measured to be 1.26 g.

COMPARATIVE EXAMPLE 6

Over a 60 minute period, 22.25 g of calcined silica (Davison 948) was fed with a constant flow of nitrogen gas through the same transfer pipe apparatus as used in Example 1. The static was measured throughout the 60 minutes. The average static was 10,000 volts. The amount of silica deposited was gravimetrically measured to be 1.85 g.

Examples 4 and 5 of the invention show that the remarkable order of magnitude reduction in generated static is still observed over longer periods of time and with greater amounts of transported solids. This reduced static reduces deposition as seen by the lower amount of deposited silica in Examples 4 and 5.

COMPARATIVE EXAMPLE 7

Over a 30 minute period, 11.1 g of calcined silica (Davison 948) was fed with a constant flow of a mixture of 25% by volume helium and 75% by volume nitrogen gas through the same transfer pipe apparatus as used in Example 1. This was performed in triplicate. In each instance the static was measured throughout the 30 minutes. The average static was 13,500 volts. For each of the runs, the amount of silica deposited was gravimetrically measured. The average deposition was 1.35 g.

COMPARATIVE EXAMPLE 8

Over a 30 minute period, 11.1 g of calcined silica (Davison 948) was fed with a constant flow of a mixture of 50% by volume helium and 50% by volume nitrogen gas through the same transfer pipe apparatus as used in Example 1. This was performed in triplicate. In each instance the static was measured throughout the 30 minutes. The average static was 10,700 volts. For each of the runs, the amount of silica deposited was gravimetrically measured. The average deposition was 1.52 g.

Comparative examples 7 and 8 show that the remarkable reduction in generated static is not achieved when the noble gas is present at or below 50% by volume.

The preceding examples are meant only as illustrations. The following claims define the invention.

We claim:

1. A process which comprises polymerizing an olefin in a reactor in the gas phase in the presence of a catalyst, wherein the catalyst is fed to the reactor in a stream of gas that comprises at least 75 volume % of helium.

2. The process of claim 1 wherein the stream of gas comprises at least 90 volume % of helium.

3. The process of claim 1 wherein the stream of gas includes nitrogen.

4. The process of claim 1 wherein the olefin is selected from the group consisting of ethylene, propylene, 1-butene, 1-pentene, 1-hexene, 1,5-hexadiene, 1-octene, and mixtures thereof.

5. The process of claim 1 wherein the catalyst is a Ziegler-Natta catalyst.

6. The process of claim 1 wherein the catalyst is a single-site organometallic complex.

7. The process of claim 6 wherein the organometallic complex is a Group 4 transition metal complex containing one or more substituted or unsubstituted cyclopentadienyl, indenyl, or fluorenyl groups.

8. The process of claim 6 wherein the organometallic complex contains a polymerization-stable, heteroatomic anionic ligand selected from the group consisting of boraaryl, pyrrolyl, indolyl, indenoindolyl, quinolinoxy, pyridinoxy, and azaborolinyl.

9. The process of claim 1 wherein the catalyst is supported.

10. The process of claim 9 wherein the support is selected from the group consisting of silica, alumina, magnesium chloride and polyolefin.

11. The process of claim 1 wherein the polymerization is performed at a temperature within the range of about 60° C. to about 150° C.

12. The process of claim 1 wherein the helium is recycled and becomes part of fluidizing gas in the reactor.

13. The process of claim 1 wherein the reactor comprises a straight cylindrical section topped by an expansion section with a reaction zone below the expansion zone and with a fluidization grid at the bottom of the reaction zone and a product removal section right above the fluidization grid.

14. The process of claim 13 wherein the catalyst is metered from a chamber and mixed with the stream of gas to form a suspension of the catalyst in the gas and this suspension is fed to the reactor.

15. The process of claim 14 wherein the suspension is fed to the reactor above the product removal section and the fluidization grid and below the reactor expansion section.

16. The process of claim 15 wherein the suspension is fed to the reactor at a height within one reactor diameter above the fluidization grid.

17. An improved method of feeding a catalyst to a gas phase reactor wherein the catalyst is conveyed into the reactor with a stream of gas comprising at least 75 volume % of helium.

18. A process which comprises polymerizing an olefin in a fluid bed reactor in the gas phase in the presence of a catalyst, wherein the catalyst is fed to the fluid bed reactor in a stream of gas that comprises at least 75 volume % of helium.

* * * * *